Oct. 1, 1935.  W. L. MORRISON  2,016,174
AUTOMOBILE DOOR
Filed July 27, 1933  5 Sheets-Sheet 1
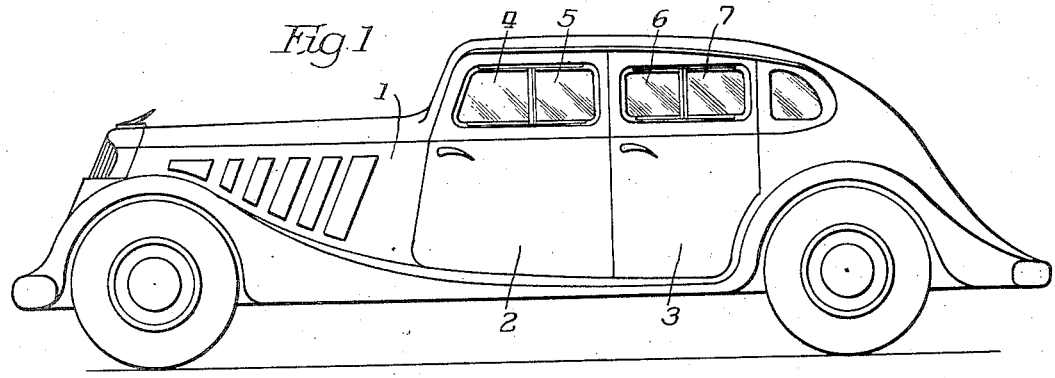
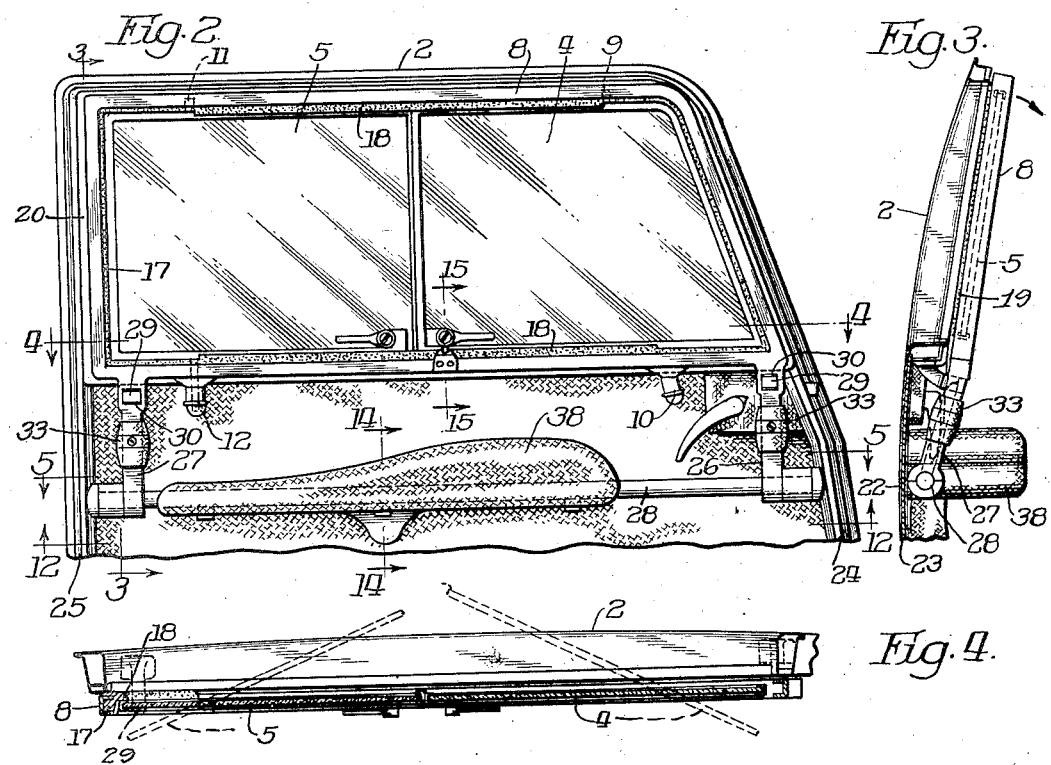
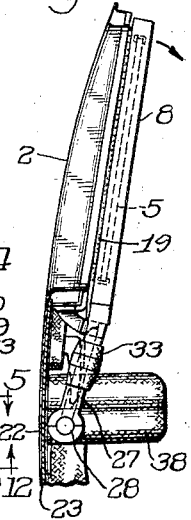
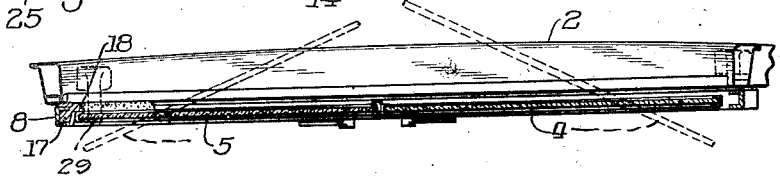
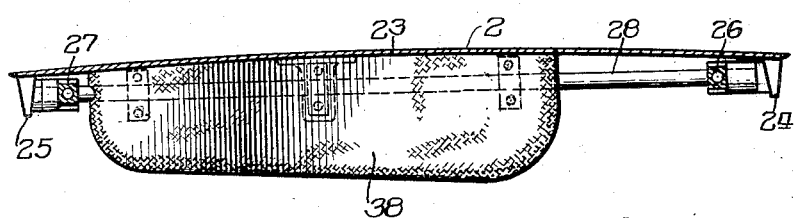
Inventor.
Willard L. Morrison.
By Parker & Carter attys

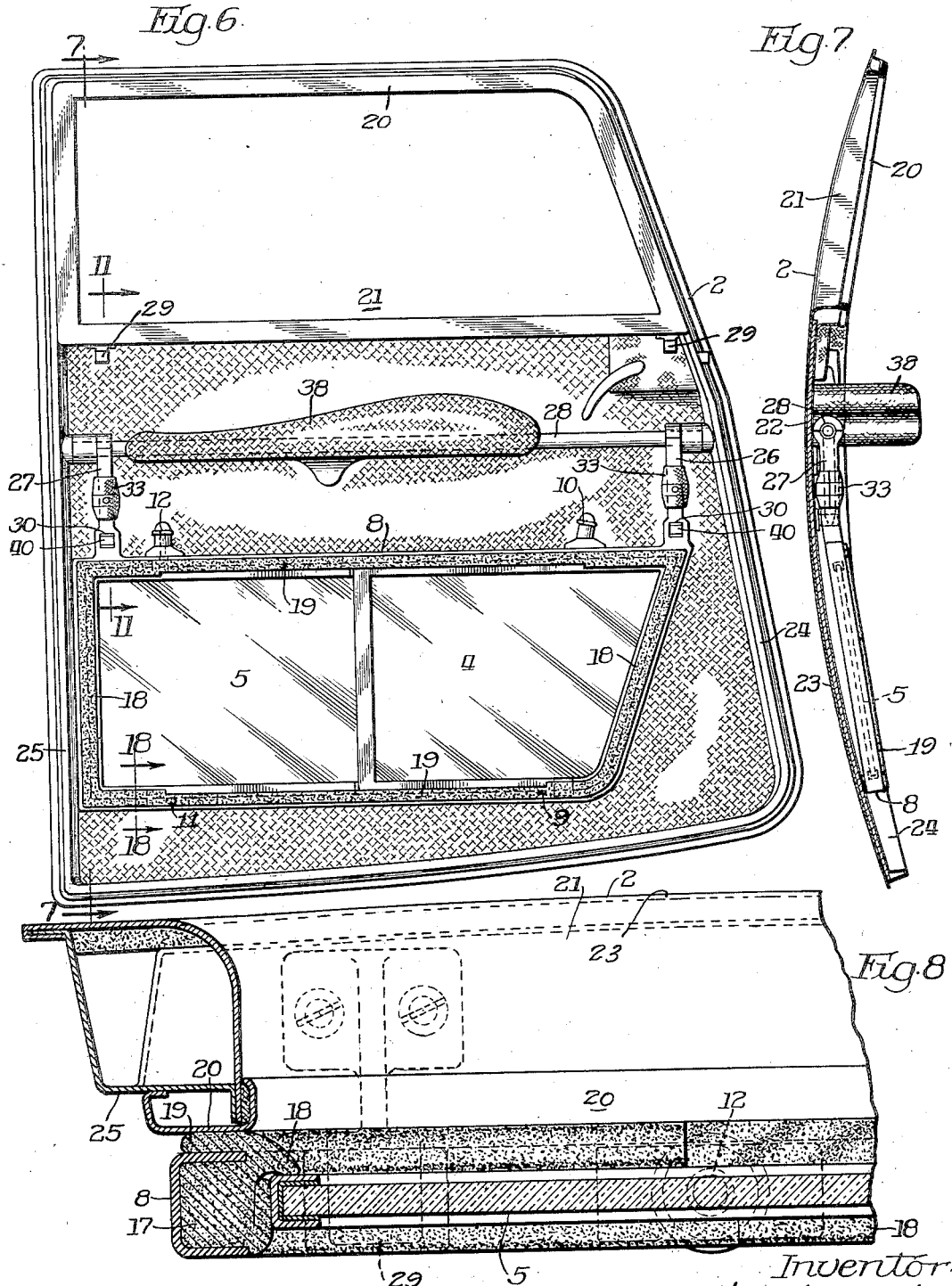

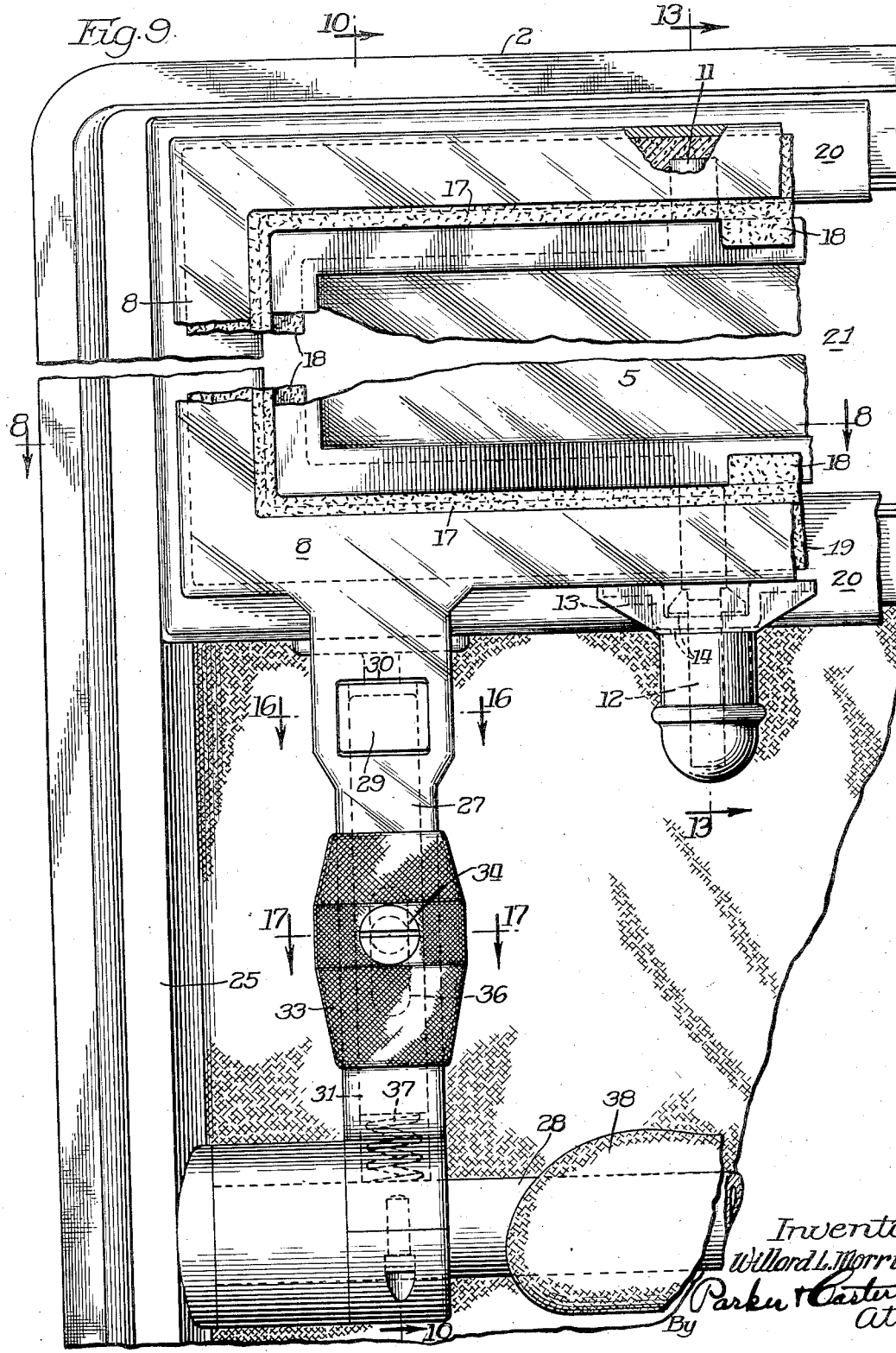

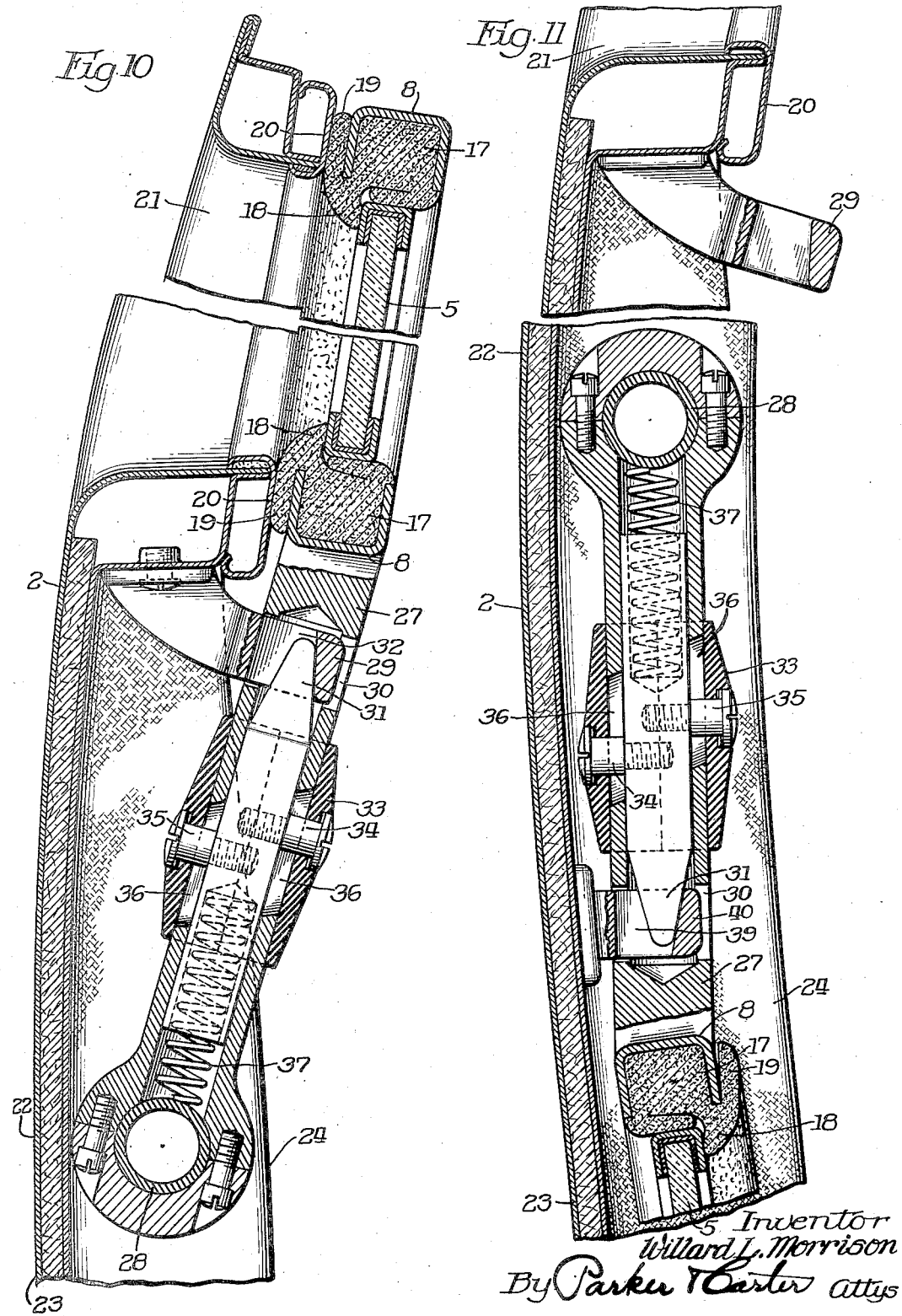

Oct. 1, 1935. W. L. MORRISON 2,016,174
AUTOMOBILE DOOR
Filed July 27, 1933 5 Sheets-Sheet 5
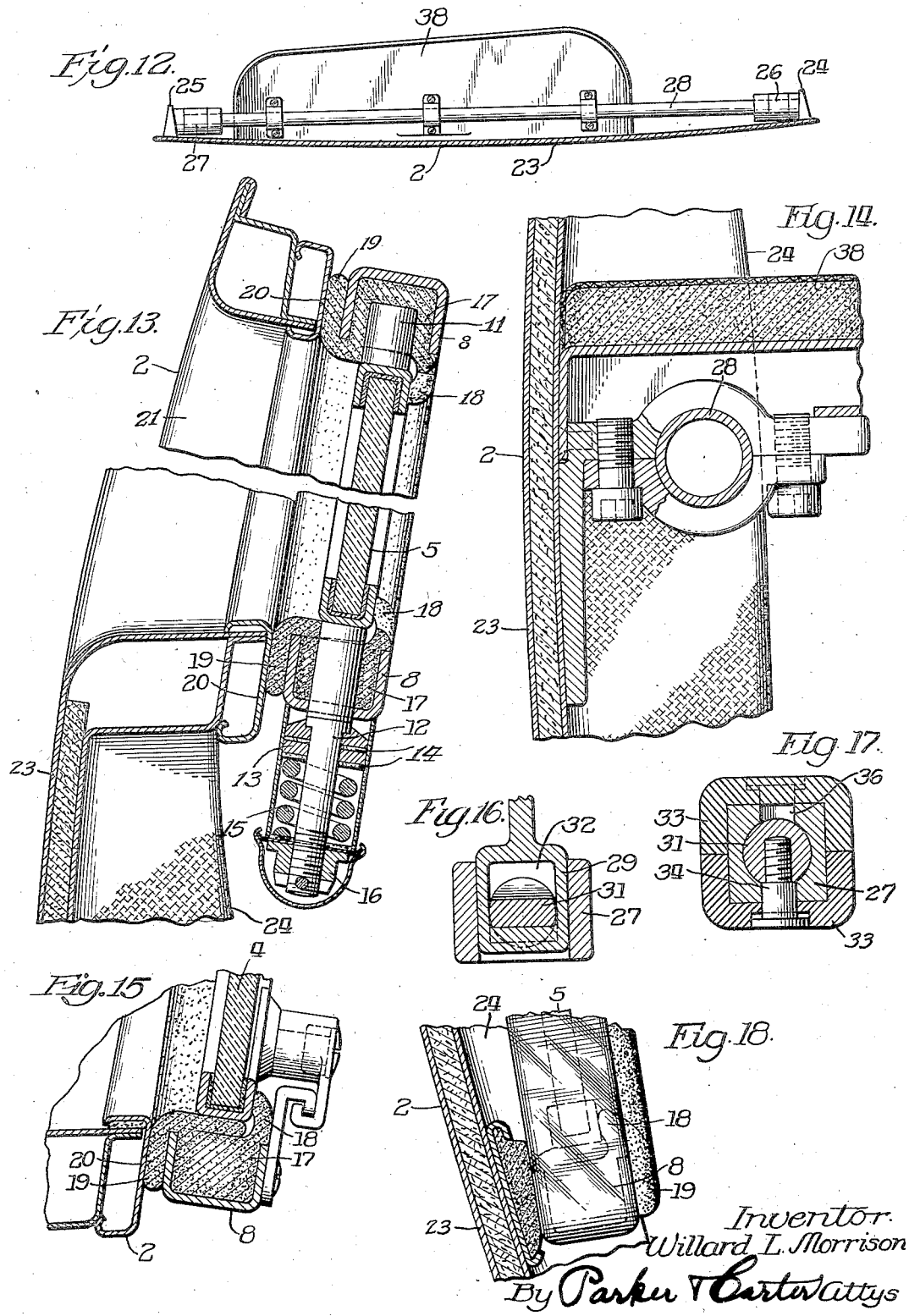

Patented Oct. 1, 1935

2,016,174

UNITED STATES PATENT OFFICE 2,016,174

AUTOMOBILE DOOR

Willard L. Morrison, Lake Forest, Ill.

Application July 27, 1933, Serial No. 682,391

19 Claims. (Cl. 296—44)

This invention relates to improvements in automobile doors and has for its object to provide a new and improved device of this description. The invention has as a further object to provide an automobile door having two ventilating pivoted window sections in the window opening, these sections arranged so that they may be moved about a pivot into a position below the window opening. The invention has as a further object to provide an automobile door with pivoted ventilating sections in the window opening, the door being bulged outwardly near its middle so that the sections cannot be slid down out of the window opening, there being provided means whereby these sections can be lowered out of the window opening into the lower part of the door. The invention has as a further object to provide an automobile door with ventilating window sections in the window opening and an arm rest below the window opening and means for lowering the ventilating window sections below the arm rest so as to leave the window opening free. The invention has as a further object to provide an automobile door just like that above described, where the arm rest can be used either when the ventilating sections are in the window opening or down below the window opening. The invention has further objects which are more particularly pointed out in the accompanying description.

Referring now to the drawings, Fig. 1 is a view showing an automobile with a door construction embodying the invention;

Fig. 2 is an enlarged view showing the upper end of the inside of the front door illustrated in Fig. 1 with the ventilating window sections in the window opening;

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 2;

Fig. 6 is an inside view of the door showing the ventilating window sections down out of the window opening;

Fig. 7 is a sectional view taken on line 7—7 of Fig. 6;

Fig. 8 is a sectional view taken on line 8—8 of Fig. 9;

Fig. 9 is an enlarged view of the upper corner of the inside of the door with parts broken away;

Fig. 10 is a sectional view taken on line 10—10 of Fig. 9;

Fig. 11 is an enlarged sectional view taken on line 11—11 of Fig. 6;

Fig. 12 is a sectional view taken on line 12—12 of Fig. 2;

Fig. 13 is a sectional view with parts broken away taken on line 13—13 of Fig. 9;

Fig. 14 is an enlarged sectional view taken on line 14—14 of Fig. 2;

Fig. 15 is an enlarged sectional view taken on line 15—15 of Fig. 2;

Fig. 16 is a sectional view taken on line 16—16 of Fig. 9;

Fig. 17 is a sectional view taken on line 17—17 of Fig. 9;

Fig. 18 is an enlarged sectional view taken on line 18—18 of Fig. 6.

Like numerals refer to like parts throughout the several figures.

Referring now to the drawings, I have illustrated in Fig. 1 an automobile 1 having a front door 2 and a rear door 3. The front door 2 has the ventilating window sections 4 and 5 and the rear door has the ventilating window sections 6 and 7. These ventilating window sections are pivotally mounted in a frame 8. The door bulges out at the center and hence the window sections and frame cannot be slid down in the usual way. The users of automobiles are accustomed to have the window down and although this window cannot be slid down in the usual manner, I provide means for moving it down out of the way so that the window may be entirely open.

The front window section is pivoted in the frame by means of the upper pivot 9 and the lower friction pivot 10. The rear window section 5 is pivoted in the frame by the upper pivot 11 and the lower friction pivot 12. These friction pivots are preferably both alike and the pivot 12 is illustrated in Fig. 13. In this construction the pivot 12 passes through the frame 8 and through a stationary bracket 13 attached to said frame. There are friction washers 14 on each side of the bracket 13 and a spring 15 surrounds the pivot and is compressed by means of a nut 16 threaded on the end of the pivot so as to cause the friction washers 14 to compress the stationary member 12 and resist the frictional movement of the window ventilating section. The frame 8 is herein shown as of U cross section and contains a sealing member 17 having a portion 18 which the window sections engage when they are moved about their pivots to their closed position in the frame. The frame is also provided with the sealing member 19 which is brought into contact with the inside face of the member 20 surrounding the window opening 21 in the door.

The door 2 illustrated in section in Fig. 7 bulges out at the center 22 so as to secure more room within the automobile body, and for other purposes hereinafter set out. The window, therefore, cannot be slid down into the door because of this shape. The bottom portion of the door is provided with a single wall 23 so that there is a space or chamber between the two edge frame members 24 and 25 of the door, and this chamber opens into the automobile. Means is provided for moving the window sections and frame down into this space if desired so as to be out of the way. For this purpose I provide the frame 8 with supporting members 26 and 27. These supporting members are hinged at their lower ends in some suitable manner so that the window sections and frame may be moved about this hinge from the position shown in Figs. 2 and 3 to the position shown in Figs. 6 and 7. In the construction shown these supporting members are hinged to a rod 28 in any suitable manner, as by having holes at their ends through which the rod passes. The rod 28 is attached to the door.

Any suitable means may be provided for locking the window frame in its up position and in its down position. As herein shown a simple construction for this purpose is used. In this construction two fastening devices 29 at opposite sides of the door, see Figs. 2 and 10, are connected with the door and project therefrom and are received into openings 30 in the supporting members 26 and 27. Each of these supporting members is provided with a locking member 31, which preferably is enclosed thereby and slides therein and may be moved into openings 32 in the fastening devices 29, as clearly shown in Fig. 10. The engaging faces of the fastening devices 29 and the locking members 31 are preferably beveled so as to secure a wedge action.

When the locking members are in their locking position, as shown in Fig. 10, the window frame is locked in position with relation to the window opening of the door, and this wedging action presses the sealing part 19 against their opposed parts so as to form an efficient seal. When it is desired to move the window frame down out of the way, the locking members 31 are moved out of the openings 32 so as to be released from the fastening devices 29. I have illustrated a convenient way of doing this, which consists in attaching to the supporting members 26 and 27 the sliding members or handles 33 which are connected to the locking members 31. I prefer to make these handles in two pieces so they can be easily attached, and attach them by means of the fastening devices 34 and 35 with the locking member 31, there being slots 36 in the members 26 and 27 along which they can slide. Springs 37 are located in the members 26 and 27 and normally press the locking devices 31 into their locking positions.

When it is desired to lower the window frame the handles are grasped and moved downwardly to release the locking members 31 from the fastening devices 29, and then, still using the handles, the window frame may be moved about its hinged or pivotal point down to the lower part of the door into the position shown in Figures 6 and 7. Before lowering the window the door should be opened.

Attached to the door, intermediate the upper and lower position of the windows, is an arm rest 38. This arm rest may be fastened in position in any desired manner and as herein shown is attached to the rod 28. It may be slidable along this rod if desired. It will be seen that by means of this construction the arm rest can be used either when the window is up or down, the lowering of the window not interfering in any manner with the arm rest. When the window is in its down position the locking members 21 are moved into the openings 39 in the locking members 40 on the lower part of the door so that the window frame may be held against rattling. These fastening devices 40 enter the same openings 30 in the supporting members 26 and 27 into which the fastening devices 29 are received. It will be seen that by means of this construction the window frame may be moved into its upper position and locked therein, and then the ventilating sections may be moved about their pivots so as to secure any proper relation between them desired for ventilating purposes. If it is desired to move the window frame down it is only necessary for someone in the car to grasp the handles 33 and release the locking members 31 and then move the window down into the space on the inside of the lower part of the door and move the locking member 21 into locking engagement with the fastening devices 40.

This construction is particularly adaptable for convertible automobiles, that is automobiles where the top can be taken down and where the door goes only part way up to the top. In such convertible automobiles when a window is used on the door there are guides in the lower half of the door along which the window is lowered. These guides must be loose enough to permit the easy sliding up and down of the window, and when the window is up there is no proper rigid support for it and it rattles in these guides and is more or less loose and objectionable. By means of the present construction, when the window is moved up to the position shown for example in Fig. 10, it will be seen that the window is supported a considerable distance below the top of the door, which in the convertible automobile would be approximately the position of the part 20. The window, therefore, has a rigid support below the top consisting of the part 29, and will thus be held rigidly in position without wobbling or rattling. If desired, the lower part of the window may be made to tightly press against the door, which further adds to the rigidity. The upper part of the window may also be made to press against the top of the automobile if desired, but neither the pressing of the top or the bottom of the window is required to secure a rigid non-rattling window, for this rigidity may be fully secured by the parts 29 and 31 properly proportioned. If the window itself does not press against some part of the automobile, then the part 31 would entirely fill the opening in the part 29 when the window is up. It will further be noted that the pivot or rod 28 is below the lower edge of the window opening and below the door lock so that moving the window up or down does not interfere with the door lock. The movement of the window also does not interfere with the arm rest.

I have described in detail a particular construction embodying the invention, but it is of course evident that the parts may be varied in many particulars without departing from the spirit of the invention as embodied in the claims hereto attached, and I therefore do not limit myself to the particular construction shown.

I claim:

1. An automobile door having a window opening, comprising a fixed part of the door surrounding the window opening a window frame adapted when in its closed position to close the window opening in the fixed part of the door, means for supporting said frame in operative position with relation to said window opening, a chamber in the bottom of the door opening into the automobile, and a hinged connection between the window frame and the automobile door, the window frame when moved about said hinged connection to remove it from the window opening, being moved inwardly and being received into the chamber in the lower part of the door.

2. An automobile door having a window opening, comprising a fixed part of the door surrounding the window opening, a window frame adapted when in its closed position to close the window opening in the fixed part of the door, means for supporting said frame in operative position with relation to said window opening, a chamber in the bottom of the door opening into the automobile, a hinged connection between the window frame and the automobile door, the window frame when moved about said hinged connection to remove it from the window opening, being moved inwardly and being received into the chamber in the lower part of the door, and means for locking the window frame in its operative position with relation to said window opening.

3. An automobile door having a window opening, comprising a window frame, means for supporting said frame in operative position with relation to said window opening, a chamber in the bottom of the door opening into the automobile, a hinged connection between the window frame and the automobile door, the window frame when moved about said hinged connection being received into the chamber in the lower part of the door, and a single releasable locking means adapted to be moved on opposite sides of said hinged connection for locking said window frame in its operative closing position with relation to the window opening or in the chamber in the bottom of the door.

4. An automobile door having a window opening near the top, a fixed part of the door surrounding the window opening and a chamber near the bottom opening into the interior of the automobile and normally open and accessible from said interior, a window frame, means for supporting said window frame in operative position with relation to the window opening, and means for rotating said window frame inwardly about an axis below the window opening to move it away from the window opening and into the chamber in the bottom of the door.

5. An automobile door having a window opening near the top a fixed part of the door surrounding the window opening and a chamber near the bottom opening into the interior of the automobile and normally open and accessible from said interior, a window frame, means for supporting said window frame at one side of the said window opening and in engagement with a wall surrounding the window opening, and a pivotal connection between said window frame and said door by means of which the frame may be moved to a position at the top of the door into a position at the bottm of the door.

6. An automobile door having a window opening near the top and a chamber near the bottom opening into the automobile, a window frame, means for supporting said window frame at one side of the said window opening and in engagement with a wall surrounding the window opening, a pivotal connection between said window frame and said door by means of which the frame may be moved to a position at the top of the door into a position at the bottom of the door, and an arm rest projecting under said window frame and connected with said door intermediate the upper and lower positions of said window frame so that said arm rest can be used when the window frame is in either its up or down position.

7. An automobile door having a window opening near the top, a fixed part of the door surrounding the window opening and a chamber near the bottom opening into the interior of the automobile and normally open and accessible from said interior, a window frame, means for supporting said window frame at one side of the said window opening and in engagement with a wall surrounding the window opening, a pivotal connection between said window frame and said door by means of which the frame may be moved to a position at the top of the door into a position at the bottom of the door, and locking means for locking said window frame in its upper or lower position.

8. An automobile door having a window opening near the top, a fixed part of the door surrounding the window opening and a chamber near the bottom opening into the interior of the automobile and normally open and accessible from said interior, a window frame, means for supporting said window frame at one side of the said window opening and in engagement with a wall surrounding the window opening, a pivotal connection between said window frame and said door by means of which the frame may be moved to a position at the top of the door into a position at the bottom of the door, and a sealing member connected with said window frame and interposed between the window frame and the wall surrounding the window opening.

9. An automobile door having a window opening near the top, a wall forming a fixed part of the door surrounding said window opening, a window frame on the inside of the wall provided with the window opening and engaging the inner face of the wall surrounding said window opening, and means for removably holding said window frame in said latter position.

10. An automobile door having a window opening near the top, a wall forming a fixed part of the door surrounding said window opening, a window frame on the inside of the wall provided with the window opening and engaging the inner face of the wall surrounding said window opening, means for holding said window frame in said latter position, and means for moving said window frame away from said window opening to provide a completely open window opening.

11. An automobile door having an outwardly bulging central portion, a window opening near the top, a fixed part of the automobile surrounding the window opening, a chamber in the door near the bottom opening into the automobile, a window frame adapted normally to be held in position opposite the window opening in engagement with the inner vertical face of the part of the automobile surrounding the window opening, and means for moving said window frame downwardly, inwardly and laterally into the chamber in the lower part of said door.

12. The combination with an automobile door, of a window, a fixed part of the automobile door surrounding the window, said window engaging the inner vertical face of said fixed part when in its closed position, a rigid support for said window below the lower edge of the window, and means for moving said window down out of the way.

13. An automobile door comprising a fixed part of the automobile surrounding a window opening, a bottom portion, a window engaging the vertical face of the fixed part of the automobile surrounding the window when the window is in its closed position, said window having a pivotal connection with said bottom portion, the pivotal connection being about an axis extending crosswise of the door so that when the window is moved about the axis it is moved from the top toward the bottom of the door, and a rigid supporting device for supporting the window at the top of the door.

14. An automobile door comprising a fixed part of the automobile surrounding a window opening, a bottom portion, a window engaging the vertical face of the fixed part of the automobile surrounding the window when the window is in its closed position, said window projecting above said bottom portion when in its up position, a holding device for holding said window in its up position, and means for releasing said window from the holding device so that it may be moved down toward the bottom of the door.

15. An automobile door having a bottom portion, a window, a rod extending crosswise of the door and pivotally connecting said window thereto, the movement of said window about its pivotal connection moving it from its up position to its down position.

16. An automobile door having an outwardly bulging central portion, a window having a pivotal connection with said door at its outwardly bulging portion, the axis of said pivotal connection extending crosswise of the door.

17. An automobile door having an outwardly bulging central portion, a window having a pivotal connection with said door at its outwardly bulging portion, the axis of said pivotal connection extending crosswise of the door, and means for moving said window about said pivotal connection to lower it.

18. An automobile door comprising a bottom portion, a window having a pivotal connection with said bottom portion, the pivotal connection being about an axis extending crosswise of the door so that when the window is moved about the axis it is moved from the top toward the bottom of the door, a rigid supporting device for supporting the window at the top of the door, an arm rest projecting under said window and connected with said door and accessible when the window is either in its up position or its down position.

19. An automobile door comprising a bottom portion, a window having a pivotal connection with said bottom portion, the pivotal connection being about an axis extending crosswise of the door so that when the window is moved about the axis it is moved from the top toward the bottom of the door, a rigid supporting device for supporting the window at the top of the door, a lock for said door having a handle on the inside of the door, the lower edge of the window being above the lock when the window is in its up position and below the lock when the window is in its down position so as not to interfere with the free access to the handle of said lock.

WILLARD L. MORRISON.